United States Patent Office 3,441,512
Patented Apr. 29, 1969

3,441,512
YTTRIUM VANADATE EUROPIUM PHOSPHOR
PREPARATION BY PRECIPITATION USING
AMMONIUM CARBONATE
Frank P. Durkee, Novelty, Ohio, assignor to General
Electric Company, a corporation of New York
No Drawing. Filed July 18, 1966, Ser. No. 565,720
Int. Cl. C09k 1/44, 1/04
U.S. Cl. 252—301.4                                      6 Claims

ABSTRACT OF THE DISCLOSURE

The process for preparing europium activated yttrium vanadate phosphors ($YVO_4$:Eu) involves precipitating $YVO_4$:Eu from a nitric acid solution of yttrium, europium, and vanadium ions with ammonium carbonate. The precipitate is heated at elevated temperatures to produce well-crystallized $YVO_4$:Eu phosphor.

---

This invention relates to a process for the preparation of yttrium vanadate phosphor activated with europium ($YVO_4$:Eu). More specifically, it concerns a process for the preparation of such materials by precipitation of the components along with a vanadium compound, followed by firing of the mixed precipitated material to economically produce an improved phosphor. This invention constitutes an improvement over the invention described and claimed in application Ser. No. 565,737, filed concurrently herewith in the name of Herbert J. Kauders.

Yttrium vanadate phosphors activated with europium have become commercially important for use as the red component in color television tubes and in certain lamp applications, as well as for laser applications particularly in the form of relatively large crystals, and in other uses.

Various means for producing such materials are known such as those described in Patent 3,152,085, Ballman et al.

Other methods for producing the phosphor include dry-blending of the components along with excess $V_2O_5$. This blend is then fired to produce the phosphor, the crystals of which are crystallized to the desired size and form in the liquid excess $V_2O_5$. Suitable starting materials for such a process are $Y_2O_3$, $Eu_2O_3$, and $V_2O_5$. Other compounds yielding the oxides on firing may be equivalent. Difficulties are encountered in the use of this method due to the inherent inhomogeneity of such dry blends and the particle size characteristics of the starting materials must be kept under control within certain limits.

In another method, the $Y_2O_3$ and $Eu_2O_3$ in the desired proportions can be coprecipitated as oxalates and fired to produce mixed rare earth oxides. Such precipitations are standard analytical techniques. The desired quantities of $V_2O_5$ or $NH_4VO_3$ are then blended with the mixed oxides for a second firing to produce the phosphor crystals in the desired bath of excess $V_2O_5$ which is subsequently removed from the crystals. This process, known as the oxalate process, preferably requires two firings and extra blending steps, thereby increasing the cost of the process.

It is an object of the present invention to provide a new and less costly, more efficient process for producing yttrium vanadate phosphors activated with europium.

It is also an object of the invention to provide such a process in which only one firing is necessary.

Another object of the invention is to provide such a process in which the particle sizes of the starting materials are not controlling.

Briefly stated, the present invention is one embodiment provides a process for the production of yttrium vanadate phosphors activated with europium comprising the following steps: $Y_2O_3$ and $Eu_2O_3$, or their equivalents, are dissolved in nitric acid and water $V_2O_5$, $NH_4VO_3$ or their equivalents are added to the solution to form a reaction mixture which generally will be a slurry. All or part of the vanadium compound used may dissolve in the nitric acid solution. The $Y_2O_3$ and $Eu_2O_3$ are dissolved in the amounts and proportions required to produce the desired phosphor. $V_2O_5$ or its equivalent is added in at least the amount required for the production of a stoichiometric rare earth vanadate. The $V_2O_5$ which does not enter into the phosphor formulation will act as a recrystallizing bath for the production of the desired phosphor crystals. The suspension is then neutralized with ammonium carbonate, precipitating phosphor material of $YVO_4$:Eu along with an unidentified vanadium compound. This material is then filtered, preferably at about 75° C., to separate the solids from the acid which is disposed of. The precipitated phosphor material and vanadium compound are then fired at a temperature in the range of about 900–1100° C. for a time in the range of about 1–4 hours, preferably about 950° C. for about 2 hours, to produce a well-crystallized $YVO_4$:Eu phosphor and excess $V_2O_5$. The $V_2O_5$ is then removed by techniques known in the art such as by washing the material produced in the firing with a solution of NaOH and $Na_2CO_3$ in water at a temperature in the range of 80–100° C. This dissolves the excess $V_2O_5$ and allows it to be removed from the phosphor.

The present invention involves the discovery that neutralization of the nitric acid solution containing the suspended $V_2O_5$ or its equivalent, when done with ammonium carbonate rather than ammonium hydroxide, results in a precipitate combined with vanadium compound which could be filtered much more readily, in less than one-fifth the time required under similar conditions.

Phosphors produced in accordance with the present invention are equivalent in quality to those produced by the oxalate process as determined by brightness, maintenance of light output and particle size and application characteristics, but the process of the invention results in substantial economies and cost savings in production.

The following paragraphs are exemplary of the practice of the present invention and will teach persons skilled in the art the preferred embodiments of the invention.

The preferred phosphor which is described herein can be expressed as $0.95\ Y_2O_3 \cdot 0.05\ Eu_2O_3 \cdot 1.00\ V_2O_5$ recrystallized in a 30% excess $V_2O_5$ (30% by weight of phosphor or 1.685 moles $V_2O_5$ per mole of rare earth oxides). $V_2O_5$ excesses of about 20–40% have been used satisfactorily. Throughout materials of sufficient purity that they are capable of producing satisfactory phosphor should be used.

A solution of 72 milliliters (ml.) of 70% nitric acid and 600 ml. of water is prepared in a one liter beaker. To this solution are added 32.10 grams of $Y_2O_3$ and 2.64 grams of $Eu_2O_3$. The mixture is heated to 90±5° C. with agitation, as for example on a magnetic stirrer hot plate, until the rare earth oxides are dissolved as evidenced by a clear solution.

To the hot clear solution of rare earth nitrates are added 59.1 grams of ammonium metavanadate or 45.9 grams of vanadaium pentoxide. The resulting brown slurry is maintained at 90±5° C. with agitation while ammonium carbonate solution is added slowly. As the quantity of ammonium carbonate solution added increases the slurry changes in color from brown to cream colored and as the quantity approaches that needed for neutrality, the color becomes white indicating that the reaction is essentially complete.

The slurry, now white, is continued to be agitated at 90±5° C. for 1–2 hours to promote crystal growth and then is discharged on a 4-inch diameter Büchner funnel where the mother liquor is removed.

The damp cake may be loaded directly into calcining vessels such as a 100 ml. quartz crucible or, alternately, it may be dried at 105–115° C., then loaded into the same type of crucible.

Calcining is carried out in an electric furnace in open crucibles at temperatures between 900° C. and 1100° C. for times between 1 and 4 hours. Typically 950° C. and 2 hours is used for a mass of approximately 100 grams in a 100 ml. crucible.

The calcined material is preferably cooled slowly to minimize sticking to the surface of the crucible.

The calcined material is crushed and milled by mortar and pestle to a fine powder of approximately 40 microns diameter.

The crystalline yttrium europium orthovanadate is separated from the excess vanadium pentoxide used for recrystallization purposes by leaching the finely divided calcined product in a hot alkaline solution. Typically into a 500 ml. beaker are added 275 ml. of water, 28.5 grams of monohydrated sodium carbonate and 19 ml. of 50% sodium hydroxide solution (specific gravity 1.526 at 20° C.). Alternately, 14.5 grams of solid sodium hydroxide flake may be used instead of the sodium hydroxide. The sodium carbonate is dissolved. To the solution is added 80 grams of finely divided calcined material and with agitation the slurry is heated to 90–95° C. for 20–30 minutes on a magnetic stirrer hot plate. The beaker is removed from the hot plate and the phosphor allowed to settle out of suspension. The settled product is essentially white in color. The supernatant liquid is removed. To the thick slurry of phosphor is added approximately 375 ml. of water and the slurry is again agitated and heated to 90–95° C. for 20–30 minutes. Agitation is stopped, and the product allowed to settle and the supernatant removed.

Enough water is again added to the settled thick slurry and the mixture agitated and discharged into a 4-inch Büchner funnel where the residual traces of caustic are removed by washing through the cake 500 ml. of water over a period of 20 minutes.

The cake is removed and dried in a Pyrex tray in an oven at 110–150° C. for one hour. The cooled product is finally sifted through 400-mesh stainless steel.

Finished yield normally exceeds 60 grams (96.8% of theoretical) and is typically 60.5 grams (97.6%).

Nitric acid for the dissolution proved to be the best of the acids tried. These included hydrochloric, sulfuric, acetic, and oxalic. Ammonium nitrate is more soluble in water than ammonia compounds of the other acids, which may contribute to better filtration. The ammonium nitrate which remained in solution was readily filtered off, and the trace amounts which were trapped in the precipitate burned off harmlessly in contrast to all the other ammonium compounds obtained using other acids. Ammonium hydroxide and ammonium carbonate were found to be preferred for neutralization, but at least small amounts of alkali hydroxides can be tolerated. The amount of nitric acid needed is only that amount used for dissolving the rare earth oxides. At a pH of approximately 8 and at temperatures of 75° C. or higher the precipitation was found to be complete and the filtrate contained ammonium nitrate with only traces of vanadium and no rare earths.

The dried product ready for calcining is composed of yttrium europium orthovanadate and an unknown vanadium compound, possibly a hydrated vanadium pentoxide or vanadic acid, $H_2V_4O_{11}$ or $HVO_3$, of a low degree of crystallinity. The presence of reasonably well-crystallized yttrium europium vanadate is shown by X-ray diffraction analysis and confirmed by a weak red photoluminescence without thermal treatment beyond the 110° C. drying.

What I claim as new and desire to secure by Letters Patent of the United States is:

1. In a process for producing yttrium vanadate phosphor activated with europium, the following steps:
    (a) producing a reaction mixture by dissolving in nitric acid and water approximately desired quantities of components of the phosphor including $Y_2O_3$, $Eu_2O_3$, or compounds which decompose to produce such components, and then adding $V_2O_5$, $NH_4VO_3$, or compounds which decompose to produce $V_2O_5$, in at least the amount necessary to produce the phosphor,
    (b) treating the reaction mixture produced in step (a) with ammonium carbonate to produce a mixed precipitate including yttrium vanadate containing europium, and a vanadium compound,
    (c) separating said mixed precipitate of step (b) from the reaction mixture,
    (d) heating said mixed precipitate of step (c) at elevated temperatures for a time sufficient to produce well-crystallized $YVO_4$:Eu phosphor.

2. The process of claim 1 in which the amount of $V_2O_5$, $NH_4VO_3$, or compounds which decompose to produce $V_2O_5$ in step (a) are from about 20% to 40% by weight in excess of the total weight of the phosphor to be produced, and in which excess $V_2O_5$ is produced by the heating of step (d) and is subsequently removed from said $YVO_4$:Eu.

3. The process of claim 2 in which the vanadium-bearing compound is provided in step (a) in an amount of about 30% in excess of the total weight of the phosphor.

4. The process of claim 1 in which heating of step (d) is performed within a temperature range of about 900–1100° C. for a time in the range of about 1–4 hours.

5. The process of claim 4 in which the heating of step (d) is performed at about 950° C. for about 2 hours.

6. The process of claim 1 in which the separation of step (c) is performed by filtration at at least about 75° C.

References Cited

UNITED STATES PATENTS 3,357,925  12/1967  Levine et al. _____ 252—301.4
3,360,480  12/1967  Martin _____ 252—301.4

TOBIAS E. LEVOW, *Primary Examiner.*

ROBERT D. EDMONDS, *Assistant Examiner.*

U.S. Cl. X.R.

23—51